(12) United States Patent
Manjura

(10) Patent No.: US 12,186,933 B2
(45) Date of Patent: Jan. 7, 2025

(54) METHOD FOR PRODUCING AN ADDITIVELY MANUFACTURED PRODUCT FROM A MINERAL STARTING MATERIAL BY MEANS OF DIRECT LASER SINTERING, AND LIGHTWEIGHT PART PRODUCED BY MEANS OF SAID METHOD

(71) Applicant: ING3D GmbH, Fürth (DE)

(72) Inventor: David Manjura, Seukendorf (DE)

(73) Assignee: ING3D GmbH (DE)

( * ) Notice: Subject to any disclaimer, the term of this patent is extended or adjusted under 35 U.S.C. 154(b) by 172 days.

(21) Appl. No.: 17/634,095

(22) PCT Filed: Aug. 6, 2020

(86) PCT No.: PCT/IB2020/057447
§ 371 (c)(1),
(2) Date: Feb. 9, 2022

(87) PCT Pub. No.: WO2021/028797
PCT Pub. Date: Feb. 18, 2021

(65) Prior Publication Data
US 2022/0347882 A1    Nov. 3, 2022

(30) Foreign Application Priority Data

Aug. 9, 2019 (DE) .................... 10 2019 005 605.1

(51) Int. Cl.
*B28B 1/00* (2006.01)
*B33Y 10/00* (2015.01)
*B33Y 80/00* (2015.01)

(52) U.S. Cl.
CPC .............. *B28B 1/001* (2013.01); *B33Y 10/00* (2014.12); *B33Y 80/00* (2014.12)

(58) Field of Classification Search
None
See application file for complete search history.

(56) References Cited

U.S. PATENT DOCUMENTS 5,076,869 A   12/1991   Bourell et al.
5,640,667 A    6/1997   Freitag et al.
(Continued)

FOREIGN PATENT DOCUMENTS

CN   105254309   1/2016
CN   106390198   2/2017
(Continued)

OTHER PUBLICATIONS

Vansil Wollastonite Technical Data Sheet (Year: 2018).*
(Continued)

*Primary Examiner* — Alison L Hindenlang
*Assistant Examiner* — Virak Nguon
(74) *Attorney, Agent, or Firm* — Pandiscio & Pandiscio

(57) ABSTRACT

The invention relates to a method for utilizing mineral materials for additive manufacturing that can be implemented more quickly, more economically and with greater technical simplicity, in comparison with common additive manufacturing, by virtue of controlled expansion in the sintering process by means of a laser source. The entire production process is free of organic materials and allows previously unfeasible end uses in the fields of acoustic insulation, thermal insulation, fire protection, filtration, design objects and lightweight components to be realized. In particular, the invention relates to a method for producing a product by means of 3-D printing or additive manufacturing, wherein an open-pore lightweight part is constructed layer-by-layer, without the use of organic binders or other organic auxiliary agents, from a pulverous mineral starting raw substance of natural origin, which raw substance is obtained without chemical alteration of the solid constituents of the natural material, and wherein, beginning with the second layer, the most recently applied layer is bonded to the surface of the existing body of the lightweight part by means (Continued)

of immediately subsequently performed direct selective laser sintering.

30 Claims, 2 Drawing Sheets

(56) References Cited

U.S. PATENT DOCUMENTS

| | | | |
|---|---|---|---|
| 2004/0038009 | A1 | 2/2004 | Leyden et al. |
| 2011/0129640 | A1 | 6/2011 | Beall et al. |
| 2015/0290710 | A1* | 10/2015 | Ackelid .................. B28B 1/001 |
| | | | 419/30 |
| 2015/0298397 | A1* | 10/2015 | Chen ........................ B07B 9/00 |
| | | | 209/12.2 |
| 2018/0126650 | A1* | 5/2018 | Murphree ............... B29C 64/25 |
| 2018/0354860 | A1 | 12/2018 | Wang et al. |
| 2020/0087513 | A1* | 3/2020 | Price ..................... B29C 64/264 |
| 2020/0247004 | A1* | 8/2020 | Oshima ................. B29C 64/268 |

FOREIGN PATENT DOCUMENTS

| | | |
|---|---|---|
| CN | 108863332 | 11/2018 |
| CN | 108863332 A * | 11/2018 |
| DE | 10226188 | 12/2003 |
| DE | 102006038858 | 2/2008 |
| DE | 102010005800 | 7/2011 |
| DE | 102015113677 | 2/2017 |
| EP | 0734842 | 10/1996 |
| EP | 1347853 | 10/2003 |
| EP | 1509382 | 3/2005 |
| EP | 3260272 | 12/2017 |
| EP | 3590905 | 1/2020 |
| WO | WO 2001/014126 | 3/2001 |
| WO | WO 2011/124204 | 10/2011 |
| WO | WO 2013/053635 | 4/2013 |

OTHER PUBLICATIONS

Liu, Fabrication of Bioceramic Bone Scaffolds for Tissue Engineering (Year: 2013).*
Kale, Preparation and Characterization of Calcium Silicate for CO2 Sorption (Year: 2012).*
Eisert, 3D Printing—Mechanical Engineering Opens the Door to the Future, https://www.wiwo.de/unternehmen/industrie/drucken-statt-fraesen-3-d-druck-maschinenbau-oeffnet-tuer-zur-zukunft/7850900.html, Feb. 27, 2013.
Ingenieur.se, Homes with styrofoam insulation can become a fire hell, https://www.ingenieur.de/wirtschaft/haeuser-styropordaemmung-koennen-feuerhoelle/, Dec. 1, 2014.
Liu, Fabrication of Bioceramic Bone Scaffolds for Tissue Engineering, Journal of Materials Engineering and Performance, 23(10), 2014, pp. 3762-3769.
Rapidobject, https://www.rapidobject.com/de/Wissenswertes/3D-Druck-Preise-Kosten_1249.html, Aug. 1, 2019.
Schwager et al., Production of Glass Filters by Selective Laser Sintering, Proceedings of the SPIE, vol. 10675, May 2018, Abstract.
Sciencedirect, Perlite—an overview, https://web.archive.org/web/20201112011719/https://www.sciencedirect.com/topics/agricultural-and-biological-sciences/perlite, 2001.

* cited by examiner

METHOD FOR PRODUCING AN ADDITIVELY MANUFACTURED PRODUCT FROM A MINERAL STARTING MATERIAL BY MEANS OF DIRECT LASER SINTERING, AND LIGHTWEIGHT PART PRODUCED BY MEANS OF SAID METHOD

REFERENCE TO PENDING PRIOR PATENT APPLICATION

This patent application claims benefit of pending International (PCT) Patent Application No. PCT/IB2020/057447, filed 6 Aug. 2020 by ING3D GmbH for METHOD FOR PRODUCING AN ADDITIVELY MANUFACTURED PRODUCT FROM A MINERAL STARTING MATERIAL BY MEANS OF DIRECT LASER SINTERING, AND LIGHTWEIGHT PART PRODUCED BY MEANS OF SAID METHOD, which patent application, in turn, claims benefit of German Patent Application No. DE 10 2019 005 605.1, filed 9 Aug. 2019.

The two (2) above-identified applications are hereby incorporated herein by reference.

FIELD OF THE INVENTION

The present invention relates to a method for producing a product by means of 3-D printing, and a lightweight part produced according to this method.

In particular, the invention is directed to the utilization and use of lightweight mineral materials in powdered form, in particular having a bulk density less than 1500 kg/m$^3$, for punctiform sintering using an energy source and a continuous layer-by-layer construction. The energy source is preferably a CO2 laser having a wavelength of approximately 10.6 µm. At this wavelength, siliceous, macroscopically opaque material absorbs over 90% of the thermal energy. At a laser power above 10 watts, for a movement speed of 200 mm/s for modified light sands such as foam glass, expanded perlite, and granulated water glass, this property results in sintering at selective temperatures between 800 and 1300° C. The light sands that are modified by tempering, sieving, grinding, and in some cases inorganic coating demonstrate the distinctive property that due to a specific residual portion of moisture in the interior, in the laser sintering process they expand by the same amount by which they shrink, resulting in cancellation of the overall shrinkage. Consequently, this allows the production of stable mineral objects, which in some cases may be used directly as an end-use application without thermal aftertreatment.

BACKGROUND OF THE INVENTION

The invention takes into account the current industrial trend in the areas of lightweight construction, additive manufacturing, individualization, and sustainability. Mineral materials are increasingly replacing organic, petroleum-based insulation material such as expanded polystyrene (EPS) in the construction sector, among others, due to the poor ecobalance and high fire risk (va-Q-tec AG, composite insulation board with vacuum insulation, DE 10226188 A1 and Ingenieur. de, study for the Bundesbauministerium [German Federal Ministry of Construction], "Hauser mit Styropordammung können zur Feuerhölle werden" [Houses with Styrofoam insulation may become blazing *infernos*], Dec. 1, 2014). Furthermore, Industry 4.0 is calling for "an intense individualization of products under the conditions of highly flexible production" (Bundesministerium für Bildung und Forschung [German Federal Ministry for Education and Research], future project of Industry 4.0, August 2017). The basic principle of 3-D printing, as it is commonly known, in which materials are combined additively instead of by removal as in previous practice (drilling, milling, cutting), i.e., subtractively, offers an approach to finding a solution. According to the hype cycle developed by Gartner Inc., 3-D printing is right at the transition from pure prototype manufacture (rapid prototyping) for inspection samples to actually usable industrial products, so-called additive manufacturing (Airbus GmbH, Additive manufacturing of a part from a metal matrix composite, DE 102015113677 A1).

As described in US 2004/0 038 009 A1, CN 105 254 309 A, and EP 1 347 853 B1, for manufacture within the scope of 3-D inkjet printing or selective laser sintering or melting, it is necessary to infiltrate or temper materials from the areas of metals, polymers, and plastic-coated ceramics in industrial furnaces in order to achieve a sufficient density or to thermally remove the plastic coating, for example for pure ceramics without adherence of organic additives. While EP 1 347 853 B1 is concerned only with the 3-D printing of metal parts, US 2004/0 038 009 A1 teaches the use of a water-soluble crosslinking agent for binding a powder.

It is known from EP 1 509 382 B1 to apply two different material components in layers one above the other, one component being a powder and the other a binder. In contrast, U.S. Pat. No. 5,640,667 A is concerned with the 3-D printing of metallic substances.

In addition, U.S. Pat. No. 5,076,869 relates to 3-D printing using multiple different material components. According to EP 1 347 853 B1, when selective laser sintering is used within the scope of manufacturing metallic objects, it is necessary to use a protective gas; furthermore, temperature control or preheating of the print chamber and/or the powdered material and sealing off the print chamber are necessary.

Devices and associated methods for selective laser sintering of powders, based on a stereolithography device, are known from WO 01/014 126 A1 and EP 0 734 842 A. The cited unexamined patent applications do not mention a targeted change of the energy usage for a controlled alteration of chemical and physical properties within the printed object.

It is known from WO 2013/053 635 A1 to thermally expand or blow perlite and vermiculite in a targeted manner. However, there is no mention of either thermal post-expansion by means of a laser source, or to the use of sintering for the layered construction of three-dimensional parts.

It is known from EP 3 260 272 B1, WO 2011/124 204 A1, and DE 10 2006 038 858 A1 to manufacture three-dimensional parts, possibly made of sand, for the construction industry, among others. In the cited references, liquid organic adhesives or additives such as polyurethane resins and epoxy resins, among others, are used for bonding the sand, and are applied dropwise to reactively coated powder.

From DE 10 2010 005 800 A1 insulation materials are known which are made of fumed silica for the high-temperature range and to press them to form molded bodies, which sometimes must be manually customized to individual customer preferences.

As a rule, mineral construction products are further processed by means of machining production processes for appearance-related or functional purposes. The machining production process, in comparison to additive manufacturing, offers fewer degrees of freedom for the end product. In addition, the products must run through two production steps (manufacture of the elements and subsequent further processing), which cannot be uniformly automated. Not least of all, during machining excess material is removed, which for the most part cannot be reused. Depending on the requirements, this may amount to as much as 90% of the workpiece (see Rebecca Eisert: "Drucken statt Fräsen: 3-D-Druck—Maschinenbau öffnet Tür zur Zukunft" ["Printing instead of milling: 3-D printing in machine construction opens the door to the future"], WirtschaftsWoche, Feb. 27, 2013).

SUMMARY OF THE INVENTION

The disadvantages of the known prior art have resulted in the object of the present invention, to provide a method for producing a filigreed lightweight part by means of additive manufacturing.

Within the scope of a generic method, this object is achieved by constructing an open-pore lightweight part layer by layer, without the use of organic binders or other organic auxiliary agents, from a powdered mineral raw starting material of natural origin that is obtained without chemical alteration of the solid components of the natural material, wherein, beginning with the second layer, in each case the most recently applied layer is bonded to the surface of the existing body of the lightweight part by means of direct selective laser sintering that is performed immediately afterward.

The use of a powdered mineral raw starting material of natural origin that is obtained without chemical alteration of the solid components of the natural material results in a very simple and therefore economical method, with regard to the design as well as to the raw starting material to be used. In addition, during the laser sintering, apart from the laser radiation, it is not necessary either for the powdered mineral raw starting material to undergo additional preheating, or for the produced lightweight part to undergo a subsequent sintering process. However, the mineral raw starting material may possibly undergo thermal pretreatment, in particular in the form of expansion or blowing, prior to the laser sintering, but no chemical alteration of the solid components of the raw starting material takes place.

By use of mineral direct laser sintering according to the present invention, stable components may be manufactured that have a framework structure with web thicknesses of 0.2 to 1.5 mm, and with bulk densities less than 1000 $kg/m^3$, preferably 150 $kg/m^3$. The components achieve coefficients of thermal conductivity of less than 0.035 W/mK, and are therefore a better insulator than expanded polystyrene. Vacuumized objects even show values of 0.014 W/mK. By use of additive manufacturing, 3-D objects may be produced in the shipbuilding or aircraft construction sectors, for example, which with regard to insulation greatly reduce thermal bridges at a complex external structure to be insulated, and at the same time contribute to fire and noise protection.

As a result of the direct melting or sintering of the mineral material, the invention makes subsequent tempering obsolete, and makes infiltration by other materials optional.

In general, the end products from 3-D inkjet printing or selective laser sintering or melting have a density between approximately 1200 $kg/m^3$ (for quartz sand) and approximately 7000 $kg/m^3$ (for metals), and for objects several cubic meters in size are less suitable for the end use, for example aircraft construction, due to the high final weight. By use of a glass foam matrix, the invention achieves bulk densities of 100 to 1000 $kg/m^3$, which may be utilized for objects several cubic meters in size. These objects, among others, may be optimally utilized in the particular end use by the intelligent arrangement of statically compensating structures, such as a honeycomb structure, for specific continuous loads such as overhangs or vibrations.

For manufacturing, the invention does not require protective gas, temperature control, or sealing of the print chamber, resulting in a simplified design of the printer, which in turn results in a comparatively less expensive facility and end products. This is due on the one hand to the controlled expansion of the material during the sintering process, and on the other hand the heat-insulating properties of the material within the powder bed, as the result of which the sintering temperature is only slightly dissipated. Not least of all, thermal stresses may be better dissipated by the relatively flexible glass foam matrix than is possible with other rigid, dense materials.

The invention is based on laser sintering, which results in improved chemical-physical bonding of the layers with increased specific strength and a relatively low weight for the end product. Due to dispensing with organic binders and the direct bonding of individual grains, in addition an open-pore structure is possible that is usable for subsequent coating with catalysts or bacterial cultures, filtration of liquids and gases, vacuumizability, acoustic absorption, thermal insulation, fire inhibition, cultivation of plants, and desalination units.

The invention may be used for furnace insulation, for example for glass feeders, which thus far have been complicated to manufacture, and may be manufactured automatically, cost-effectively, and with a shape that is optimally adapted to the furnace part. This results in a great reduction in heat loss, a constant temperature in glass manufacturing being essential for a stable viscosity of the glass, so that the invention would result in a reduction in the failure rate as well as improved product quality.

The invention combines the manufacture and post-processing of the part into one process step, and also offers more degrees of freedom, which allows multifunctionality of the end product. The utilization of the raw materials is much more environmentally friendly and economical, since a significant portion of the powder, approximately 98%, may be treated by sieving and sifting and reused.

The low costs of the material, and thus the manufacturing costs of the end product, represent a further economic aspect.

In comparison to metals and polymers (see Rapidobject GmbH, http://www.rapidobject.com/de/Wissenswertes/3-D-Druck-Preise-Kosten_1249.html, Aug. 1, 2019 version), the invention is much more favorable, with less than one-fifth of the material costs or manufacturing costs. Of course, the important differences in chemical and physical properties between mineral, metallic, and polymeric materials must be taken into account.

In the prior art, tests have been conducted only with much smaller grain sizes, smaller layer thicknesses, and greater densities, without the effect of expansion during the laser sintering process. As a result, only the invention has the potential for implementing end uses of lightweight construction, acoustics, filtration, vacuumizing, insulation, and many more.

In the following discussion, the invention is compared to the May 22, 2018 publication by Schwager, A.-M., Bliedtner, J., Bruder, A., Götze, K., "Production of glass filters by selective laser sintering" from "3D Printed Optics and Additive Photonics Manufacturing," Proc. SPIE 10675. The differences are as follows:

The starting material in the cited publication is fused silica powder. This is a synthetically produced, pure quartz glass having an $SiO_2$ proportion of approximately 99 wt %, while naturally occurring quartz glasses are not suited for this process due to insufficient purity. For maintaining the purity, according to "3. Result and Discussion" the transport system, the base plate, and the leveling roller ("squeegee") must be made from this very same ultrapure quartz glass, since otherwise they would influence the starting material. The material is also "price-intensive," "not commercially available . . . specially developed for the HT-SLS" (see Chapter 3 as well as "4. Conclusion"), and is difficult to recycle due to the continual reaction with other objects inside the print chamber. Furthermore, the purity of the starting material requires much higher energy levels and temperatures for the deformation (>2000° C.), for which reason the method is also referred to as high-temperature selective laser sintering (HT-SLS).

In contrast, the method of ING3D GmbH, which is the subject of the present patent application, uses an economical natural mineral raw material, preferably perlite, which with 75 wt % $SiO_2$ has a deformation temperature of only 800° C. Due to the heterogeneous chemical composition, containing iron ($Fe_2O_3$), among other constituents, in a proportion of less than 1 mass percent, the facility design may be implemented in a cost-effective and simple manner. Additional preheating to 1000° C. (laser sintering furnace from HTM Reetz GmbH), as described under "3. Process Development, Experimental Set up and Measurement," is not necessary for the sintering with perlite, since, unlike the heavily shrinking quartz glass powder, the perlite used by ING3D GmbH at the same time results in expansion which counteracts the shrinkage. 3-D printing at room temperature is thus achievable.

The overall method of ING3D GmbH thus
is many times easier to implement (the first ING3D GmbH prototype unit is a fully functioning converted laser cutter);
is more favorable (with regard to raw material and facility design, as well as energy and thus electricity usage);
has a higher throughput or a higher production speed (according to the cited publication, optimal layer thicknesses are 150-200 μm, and for ING3D GmbH are 500 μm); and
does not require the "high degree of research" as stated in "4. Conclusion," and instead may be successfully used essentially immediately by customers for manufacturing end products.

In addition, the true density of the material manufactured according to the prepublication by Schwager et al. is 65 wt % based on the starting material, whereas for the ING3D GmbH end product the true density is less than 10 wt % of the starting material. The end products are thus much lighter (<300 kg/m$^3$) and are usable in many ways, not only as filters, but also for insulation and fire protection. Furthermore, the object size without an additional furnace attachment is practically unlimited, and for a prototype unit could be 40×40×10 cm, for example; a size of 100×100×100 cm is planned for a pilot unit.

The raw material perlite, favored by ING3D for 3-D printing, is explained in greater detail below:

The crude perlite as raw starting material is among the volcanic glasses of natural origin, having a water content of 2-5 wt % and chemical compositions of approximately 70 to 75 wt % $SiO_2$ and 10 to 15 wt % $Al_2O_3$ (see "Encyclopedia of Materials: Science and Technology," https://http://www-.sciencedirect.com/topics/agricultural-and-biological-sciences/perlite, 2001 version). Perlite is extracted in aboveground mining, primarily in Greece and Turkey (combined, approximately 85% of the worldwide reserves). The crude perlite is expanded to up to 20 times its original volume by annealing to 800 to 1000° C.

The perlite then has a bulk density of 50 to 100 kg/m$^3$, and is preferably used for insulation in residential construction or as a planting substrate.

ING3D GmbH does not use the standard perlite that is mass-produced for the residential construction or plant markets, but, rather, uses a niche product which for the annealing process is additionally swirled (in a cyclone separator), the temperature processes within the separator being regulated or controlled. This results in an oval, approximately circular grain having a bulk density between 200 and 500 kg/m$^3$. In addition, only a certain bulk density range from 350 to 450 kg/m$^3$ with a specific grading curve and moisture content is usable here for the direct laser sintering process of ING3D GmbH. In the laser sintering process developed by ING3D GmbH (mineral direct laser sintering, or MDLS for short), the individual expanded perlite grains are slightly melted on ("sintered" in technical terminology) at their surfaces, directly resulting in solid structures. The basic chemical composition does not thereby change. Only laser light results in increased temperature of the individual grains, which in turn results in a purely physical "adhesion." The residual rock water of the perlite is evaporated without any accompanying alteration of the chemical composition. For ground powders of regular glasses, quartz glasses, or siliceous powders having a similar density (a density between 1500 and 2500 kg/m$^3$), without pre- and post-processing in a furnace and without a complex machine design (see the publication "Production of glass filters by selective laser sintering" referenced above), the method discovered by ING3D GmbH, as confirmed by the applicant's own test series, would not result in a solid, usable structure, let alone an end product.

BRIEF DESCRIPTION OF THE DRAWINGS

Further features, advantages, properties, and effects based on the invention result from the following description of one exemplary embodiment of the invention, with reference to the drawings. In the drawings.

DETAILED DESCRIPTION OF THE PREFERRED EMBODIMENTS

Figure 1:
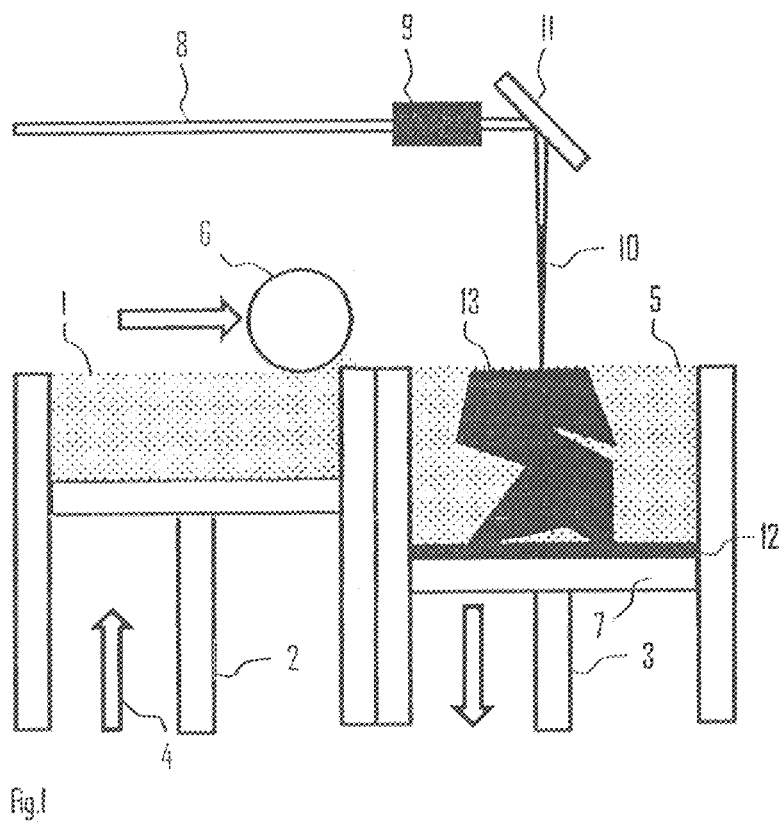
FIG. 1 shows a schematic view of a device that is suitable for carrying out the method according to the invention.

A device that is suitable for carrying out the method according to the invention includes a powder storage chamber 1 with a first piston 2, and a construction chamber 5 with a second piston 3 (see FIG. 1).

At the start of the printing operation the mineral material, which is present in powdered form, is poured into the powder storage chamber 1. When an exchangeable, mobile powder storage chamber 1 is used, it is filled with powder delivered on a conveyor belt from an upstream silo.

The filled powder is then compacted for 30 seconds on a vibrating table at a vibration frequency of 50 Hz, and the excess material is then scraped off using a straightedge.

For a fixed powder storage chamber 1 in the printing facility, the powder may be manually compacted using a hand stamper, preferably having a weight of 7 kg, that is dropped from a drop height of 1 to 3 cm in order to uniformly compact the filled material over the entire surface.

Both chambers 1, 5 preferably have the same base area; the base area of the powder storage chamber 1 may optionally be slightly larger than the base area of the construction chamber 5.

The two pistons 2 and 3 may each be moved in stages between 0.01 and 1.2 mm, for example between 0.1 and 1.0 mm, in particular by 0.6 mm, in the vertical direction, preferably in opposite vertical directions, via a stepping motor that is controlled from a controller board.

The powder bed thereby rises in the Z direction 4 in the powder storage chamber 1, by an appropriate degree beyond the edge of the print bed, and at the same time the construction chamber 5 lowers by an appropriate degree, in each case by the corresponding amount of 0.6 mm, for example.

A leveling roller 6 rotating clockwise at 5 to 30 rpm, preferably approximately 15 rpm, takes the topmost layer of the powder from the powder storage chamber 1 and distributes the powder uniformly on the base plate 7 of the construction chamber 5. After distributing a layer of the powder onto the construction chamber 5, the leveling roller 6 then travels back beyond the far side of the powder storage chamber 1. Due to the quasi-flow behavior of the powder, it may be necessary to briefly lower the construction chamber 5 and the powder storage chamber 1 during the return travel of the leveling roller 6 so that the leveling roller 6 does not push excess material over the edge of the print bed.

The mineral powder present in the construction chamber 5 is impacted by a laser beam 8 that is focused to a laser beam thickness between 0.1 and 1.0 mm via one or more focus lenses 9 connected in series, is heated at specific points, and sintered. The laser beam 10 is selectively guided in the X and Y directions, either by two linear guides or via a galvanic mirror having an F-theta objective lens, also referred to as a laser scanner 11.

After completion of the printing job for the first layer, which is possibly a support structure, optionally on a removable metal plate 12 with an adhesive coating up to 3 mm thick, preferably having a composition of 60 wt % sodium water glass, 30 wt % pre-expanded perlite that is ground for 1 h, and 10 wt % distilled water, the laser head or laser scanner 11 travels to its starting position.

The construction chamber 5 lowers once again in the Z direction by an amount between 0.01 and 1.2 mm, and the powder storage chamber 1 rises by the same amount. A further powder layer is applied by the leveling roller 6 and sintered by the laser beam 10. This operation is continued until the printing operation is completed.

The excess loose powder from the construction chamber 5 is removed using a suction device, and is sieved for the next printing application and combined with unused powder, depending on the amount of powder consumed, and prepared to ensure consistent quality.

The print object 13 is lifted from the construction chamber 5. The print object may possibly still adhere to the coated metal plate 12, in which case they are manually separated from one another at completion.

Figure 2:
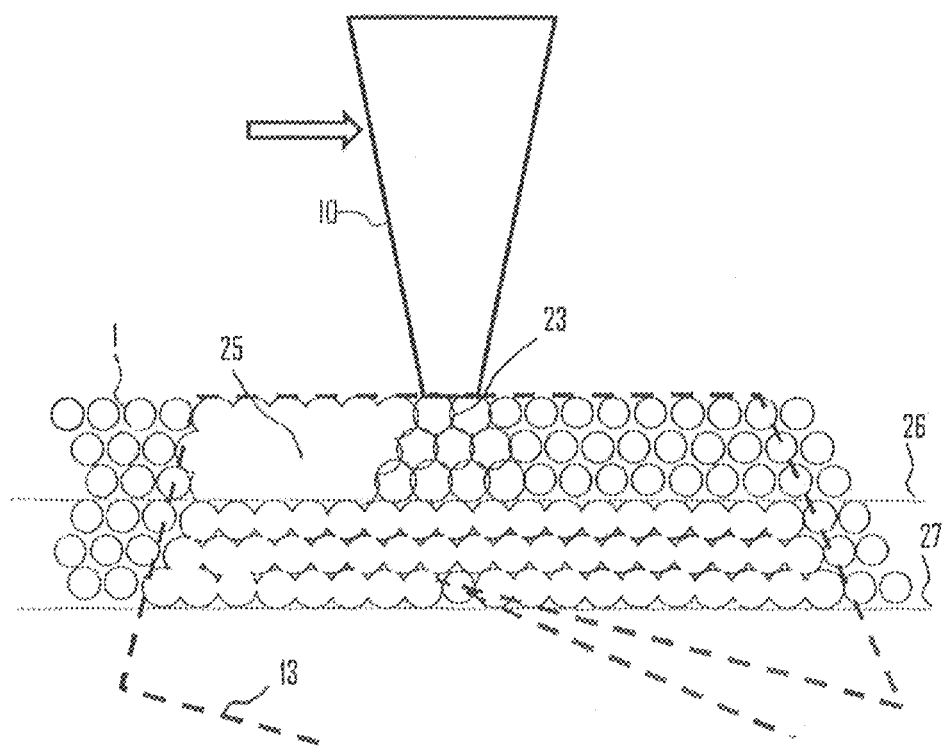
FIG. 2 shows an enlarged detail of the direct laser sintering of the powder from FIG. 1.

With the invention, it is possible to adjust selected subareas of the end product 13 in a targeted manner with regard to final strength, open porosity, and luminescence via a more or less intense degree of the energy input at specific points. FIG. 2 schematically illustrates the expanded powder 25 in layer 26, which is denser and more intensely sintered, while in layer 27 the powder is open-pored and melted less densely.

End products from previous selective laser sintering processes also have a maximum size with an approximately 65 cm edge length. In contrast, as the result of an increased production speed, based on a thicker powder application layer of up to 1.2 mm and better utilization of the absorption of the laser light, the invention is designed for end products having edge lengths of 0.5 mm to greater than 200 cm.

During the production process, fused silica may develop in the air space of the construction chamber, in particular due to localized evaporation of the raw starting material at the location of the laser sintering and/or in the area of the laser beam.

The fused silica that occurs in the air space of the construction chamber and/or in the area of the laser tubes may be collected by means of electrodeposition. This fused silica may then be marketed as a by-product independently of the actual print object, or used in some other way.

LIST OF REFERENCE NUMERALS

1 raw starting material
2 first piston
3 second piston
4 Z direction
5 construction chamber
6 leveling roller
7 base plate
8 laser beam
9 focus lens
10 laser beam
11 laser scanner
12 metal plate
13 print object
23 expansion
25 expanded powder
26 dense layer
27 porous layer

The invention claimed is:

1. A method for producing an open-pore lightweight part (13) by means of 3-D printing or additive manufacturing, characterized in that the open-pore lightweight part (13) is constructed layer by layer, without the use of organic binders or other organic auxiliary agents, from a powdered mineral raw starting material (1) of natural origin that is obtained without chemical alteration of the solid components of the natural material, and wherein, beginning with the second layer, in each case the most recently applied layer is bonded to the surface of the existing body of the lightweight part (27) by means of a laser during direct selective laser sintering that is performed immediately afterward, wherein the powdered mineral raw starting material (1) is perlite.

2. The method according to claim 1, characterized in that apart from the laser radiation, it is not necessary either for the produced lightweight part (13) to undergo a subsequent sintering process or additional preheating.

3. The method according to claim 1, characterized in that the powdered mineral raw starting material (1) has an $SiO_2$ proportion between 50 and 85 wt %.

4. The method according to claim 3, characterized in that the powdered mineral raw starting material (1) comprises perlite having an $SiO_2$ proportion of 70 to 75 wt %.

5. The method according to claim 1, characterized in that a laser having a wavelength of 5 µm or greater.

6. The method according to claim 5, characterized in that a $CO_2$ laser (10) is used.

7. The method according to claim 1, characterized in that the energy of the laser is selected such that the energy of the laser is absorbed by the powdered mineral raw starting material (1) and converted into heat, which in turn melts the individual grains of the powdered mineral raw starting material (1) on the surface, thus thermally melting or sintering (25) the grains of the powdered mineral raw starting material (1) to one another.

8. The method according to claim 1, characterized in that the thermal energy of the laser beam is selected such that the thermal energy of the laser beam causes an expansion or blowing (23) of the powdered mineral raw starting material (1) that is exposed to the laser radiation, and thereby counteracts a shrinkage of the printed lightweight part (13) that would otherwise occur during a laser sintering process.

9. The method according to claim 1, characterized in that the powdered mineral raw starting material (1) has a moisture content between 0.1 and 5.0 wt %.

10. The method according to claim 9, characterized in that the powdered mineral raw starting material (1) has a moisture content between 0.5 and 2.0 wt %.

11. The method according to claim 1, characterized in that the powdered mineral raw starting material (1) has a bulk density between 100 and 700 kg/m³.

12. The method according to claim 11, characterized in that the powdered mineral raw starting material (1) has a bulk density of 300 to 500 kg/m3.

13. The method according to claim 1, characterized in that the powdered mineral raw starting material (1) has a grain size between 1 and 500 μm.

14. The method according to claim 13, characterized in that the powdered mineral raw starting material (1) has a grain size greater than 80 μm.

15. The method according to claim 14, characterized in that the powdered mineral raw starting material (1) is the result of dry sieving or at least a similar separation process.

16. The method according to claim 1, characterized in that the thickness of an individual layer is between 0.01 and 1.2 mm.

17. The method according to claim 16, characterized in that the thickness of an individual layer is between 0.4 and 0.8 mm.

18. The method according to claim 1, characterized in that the powdered mineral raw starting material (1) undergoes thermal pretreatment.

19. The method according to claim 18, characterized in that the powdered mineral raw starting material (1) undergoes thermal pretreatment in the form of expansion or blowing.

20. The method according to claim 1, characterized in that for an optimally uniform application by means of a leveling roller, the powdered mineral raw starting material (1) is uniformly recompacted over the entire surface for at least 20 seconds per 2 to 7 cm of the filled material.

21. The method according to claim 20, characterized in that for an optimally uniform application by means of a leveling roller, the powdered mineral raw starting material (1) is uniformly recompacted over the entire surface by machine with the aid of a vibrating table at a vibration frequency of 40 to 60 Hz.

22. The method according to claim 20, characterized in that for an optimally uniform application by means of a leveling roller, the powdered mineral raw starting material (1) is uniformly recompacted over the entire surface manually with the aid of a hand stamper having a weight between 5 and 10 kg at a drop height of 1 to 3 cm.

23. The method according to claim 1, characterized in that the power of the laser is between 10 and 10,000 W.

24. The method according to claim 1, characterized in that the scanning speed of the laser beam (10) is between 20 and 10,000 mm/s.

25. The method according to claim 24, characterized in that the ratio of the laser power to the scanning speed is between 0.01 and 1 Ws/mm.

26. The method according to claim 25, characterized in that the ratio of the laser power to the scanning speed is between 0.05 and 0.3 Ws/mm.

27. The method according to claim 1, characterized in that during the sintering of powdered mineral raw starting material (1) in the form of perlite or modified perlite, fumed silica results as a by-product.

28. The method according to claim 27, characterized in that during the sintering of perlite or modified perlite, fumed silica results as a by-product, having an $SiO_2$ proportion of 75 wt % to 99 wt %, or having an $SiO_2$ proportion of 80 wt % to 90 wt %, or having an $SiO_2$ proportion of approximately 85 wt %.

29. The method according to claim 1, characterized in that the by-product that results during a sintering of powdered mineral raw starting material (1) is electrostatically separated from the exhaust air in the area of a print device during the sintering.

30. An open-pore lightweight part (13) that is made of a powdered mineral raw starting material (1) and produced using a method according to claim 1.

* * * * *